UNITED STATES PATENT OFFICE 2,163,074

AZO DYESTUFFS INSOLUBLE IN WATER AND FIBER DYED THEREWITH

Erwin Thoma, Frankfort-on-the-Main-Hochst, and Wilhelm Seidenfaden, Offenbach-on-the-Main, Germany, assignors to General Aniline Works, Inc., New York, N. Y., a corporation of Delaware No Drawing. Application March 23, 1937, Serial No. 132,648. In Germany April 2, 1936

10 Claims. (Cl. 260—188)

The present invention relates to azo-dyestuffs insoluble in water and to fiber dyed therewith; more particularly it relates to dyestuffs of the following general formula:

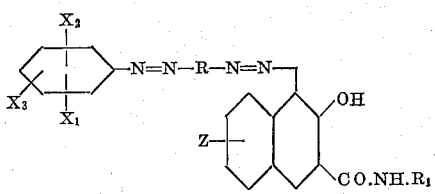

wherein the azo-groups stand in para-position to each other, R and $R_1$ stand for radicals of the benzene or naphthalene series, $X_1$ stands for a member of the group consisting of

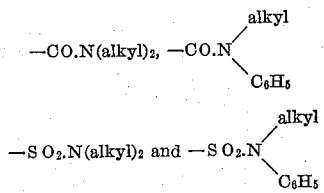

$X_2$ means halogen, a nitro or cyano group, $X_3$ hydrogen, halogen or alkoxy and Z hydrogen, halogen or alkoxy.

We have found that valuable water-insoluble azo-dyestuffs are obtainable by coupling an arylide of an ortho-hydroxy-aryl-carboxylic acid or beta-ketocarboxylic acid with a diazo-compound from a para-amino-azo-compound of the benzene or naphthalene series corresponding with the following general formula:

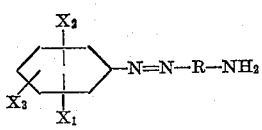

wherein the amino-group stands in para-position to the azo-group, R stands for a radical of the benzene or naphthalene series, $X_1$ stands for a member of the group consisting of

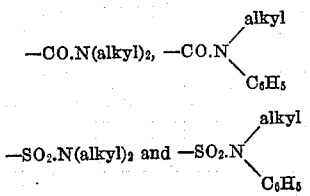

$X_2$ means halogen, a nitro or cyano group, and $X_3$ hydrogen, halogen or alkoxy; the dyestuff components must not contain any group which lends solubility, for instance a sulfonic or carboxylic acid group. The dyestuffs may be made in substance, on a fiber or on a substratum adapted for the production of lakes.

The diazonium compounds, for example the diazonium chlorides and the zinc-chloride double salts of these chlorides are in part easily soluble so that in making the dyestuffs in substance no large dilution is necessary, and in producing the dyestuff on the fiber in printing a material concentrated printing pastes are obtainable. In producing the dyestuff on yarn there may be added to the diazo-salt solution a salt, as is the case with the diazotized amines of the benzene series. Furthermore, in the case of the diazonium compounds of the aforesaid kind, there is frequently to be noticed the property, important for the making of the dyestuffs, that the mineral acid diazo-salt solutions are little sensitive to the addition of buffer agents, as for example sodium acetate. This very favorable property makes it possible, after the production of the dyestuff, to wash out easily non-coupled portions of diazonium salt. Many combinations do not bleed yellow in the washing sample and thus do not show a defect which is frequently to be observed in the combinations from diazotized 4-aminoazo-compounds which are frequently used in practice. Other combinations are of high fastness to light.

The new dyestuffs are of very various tints. Thus, by using arylides of beta-ketocarboxylic acids there are obtained on the fiber orange-red, orange-brown, bluish-red, Bordeaux-red and brown-red tints which in part cannot be obtained with the already known para-aminoazo-compounds. With the arylides of ortho-hydroxy-carbazole-carboxylic acids there may be obtained for example, currant tints of high fastness to light. Further, fine black tints are obtained which in part are essentially faster to light than the dyeings obtainable from known para-amino-azo-compounds. By using 2,3-hydroxynaphthoic acid-arylides, there are obtained, for example Bordeaux, currant, garnet, navy blue and greenish-blue, blue-black, black-violet and deep grey tints which in many cases are distinguished by a high fastness to light and good fastness to washing and chlorine.

The color tints are profoundly dependent, apart from the kind of coupling component, on the kind of the aforesaid substituents and on the position which they have in the para-aminoazo body of the benzene or naphthalene series. Further, the presence of other substituents such as alkyl-, alkoxy- or nitro-groups and halogen is of importance.

The following examples serve to illustrate the invention, but they are not intended to limit it thereto:

1. 50 grams of cotton yarn are treated with 1 liter of an alkaline grounding solution which contains 3.5 grams of 1-(2',3'-hydroxynaphthoylamino)-2-methyl-4-chlorobenzene. The grounded yarn is then developed in a solution which contains per liter 5 grams of the zinc-chloride double salt of 2,5-dimethoxy-4'-nitro-2'-carboxylic acid - dimethylamide - azobenzene- 4 -diazonium chloride, 2.5 grams of glacial acetic acid and 45 grams of sodium chloride. After soaping with 3 grams of soap and 1 gram of sodium carbonate per liter, there is obtained a dark blue of good fastness to washing and chlorine and of good fastness to light. The dyestuff corresponds with the following formula:

pyrophosphate and sodium bicarbonate is added to the grounding bath.

If instead of the grounding recommended above, 4.5 grams of 1-(2',3'-hydroxynaphthoylamino)-2,4-dimethoxy-5-chlorobenzene are used, there is also obtained a dark blue of good fastness to washing and chlorine. By using 3.5 grams of 1-(2',3'-hydroxynaphthoylamino)-naphthalene, there is obtained a dull greenish-blue.

Instead of using the separated zinc-chloride double salt of the diazonium chloride there may be used the easily obtainable diazo-solution from the amine itself by diazotizing 3.7 grams of the base in 4 cc. of hydrochloric acid of 30 per cent. strength with the addition of iced water by means of a solution of 0.7 gram of sodium nitrite and making up to 1 liter with a solution of 3 grams of sodium acetate with addition of a solution of 40 grams of sodium chloride.

2. The goods are grounded with 6.3 grams of 1-(2',3'-hydroxynaphthoylamino)-2-methylbenzene and developed with a diazo-solution from 3.6 grams of 2-methoxy-5-methyl-4'-nitro-2'-

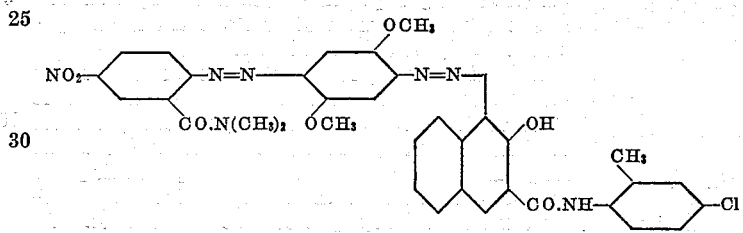

The azo-dyestuff may also be produced on other fibers than on cotton. There is, for instance, obtained a dark blue on yarn from a mixture of spun rayon and wool if the yarn is prebleached with hydrogen peroxide and sodium carboxylic acid-dimethyl-amide-4-aminoazobenzene. There is obtained a very deep dark blue of very good fastness to light.

The following table indicates a number of other azo-dyestuffs obtainable by the invention:—

| Diazo-components | Coupling components | Color tints |
|---|---|---|
| 4-amino-2-methyl-5-methoxy-2'-carboxylic acid-diethylamide-4-nitro-azobenzene. | 1-(2',3'-hydroxynaphthoyl-amino)—<br>-2,5-dimethoxy-4-chlorobenzene | Dark blue. |
| Do | do | Greenish dark blue. |
| 4-amino-2-methyl-5-methoxy-2'-carboxylic acid-dimethyl-amide-4'-nitro-azobenzene. | -4-methoxybenzene | Dull greenish blue. |
| 4-amino-2-methoxy-5-methyl-2'-carboxylic acid-dimethyl-amide-4'-nitro-azobenzene. | -2-methoxybenzene | Very deep dull blue. |
| Do | -benzene | Deep dark blue. |
| Do | -2,5-dimethoxybenzene | Very dull deep blue. |
| Do | -2,5-dimethoxy-4-chlorobenzene | Currant. |
| 4-amino-2-methoxy-5-methyl-2'-carboxylic acid-diethylamide-4'-nitro-azobenzene. | -4-chlorobenzene | Greenish dull blue. |
| Do | -benzene | Dark blue. |
| Do | -2-methylbenzene | Do. |
| Do | -4-methoxybenzene | Blue-black |
| Do | -2-methyl-4-methoxybenzene | Reddish black. |
| Do | -3-methyl-4-methoxybenzene | Reddish blue-black. |
| Do | -2,5-dimethoxybenzene | Reddish blue. |
| 4-amino-2,5-dimethoxy-2'-carboxylic acid-diethyl-amide-3'-chloro-azobenzene. | -2,5-dimethoxy-4-chlorobenzene | Blue-black. |
| 4-amino-2,5-dimethoxy-2'-carboxylic acid-diethyl-amide-4'-chloro-azobenzene. | -2-methyl-4-methoxybenzene | Very dull blue. |
| 4-amino-2,5-dimethoxy-2'-carboxylic acid-diethyl-amide-5'-chloro-azobenzene. | -3-nitrobenzene | Blue-black. |
| 4-amino-2,5-dimethoxy-3'-carboxylic acid-diethyl-amide-4'-chloro-azobenzene. | -4-methoxybenzene | Reddish dark blue. |
| Do | -2,4-dimethoxy-5-chlorobenzene | Black-blue. |
| 4-amino-2,5-dimethoxy-3'-carboxylic acid-diethyl-amide-6'-chloro-azobenzene. | -2-methyl-4-methoxy-benzene | Very reddish dark blue. |
| 4-amino-2,5-dimethoxy-4'-carboxylic acid-diethyl-amide-3'-chloro-azobenzene. | -2,5-dimethoxy-4-chlorobenzene | Very deep blue. |
| 4-amino-2,5-dimethoxy-2'-carboxylic acid-dimethyl-amide-4'-nitro-azobenzene. | -2-methyl-4-methoxybenzene | Greenish dark blue. |
| Do | -2-methylbenzene | Greenish black. |
| Do | -2-methoxybenzene | Do. |
| Do | -2,5-dimethoxybenzene | Do. |
| 4-amino-2,5-dimethoxy-2'-carboxylic acid-diethyl-amide-4'-nitro-azobenzene. | -2,5-dimethoxy-4-chlorobenzene | Dark blue. |
| Do | -benzene | Greenish black-blue. |
| Do | -2-methylbenzene | Do. |
| Do | -2-methoxybenzene | Greenish blue-black. |
| Do | -2-methyl-4-methoxy-benzene | Do. |
| Do | -2,5-dimethoxybenzene | Do. |
| 4-amino-2,5-dimethoxy-2'-carboxylic acid-N-methyl-anilide-4'-nitro-azobenzene. | 2-(2',3'-hydroxynaphthoylamino)—<br>-naphthalene | Dark blue. |

| Diazo-components | Coupling components | Color tints |
|---|---|---|
| 4-amino-2,5-dimethoxy-2'-carboxylic acid-N-methyl-anilide- 4'-nitro-azobenzene. | 1-(2',3'-hydroxynaphthoylamino)—<br>-benzene | Blue-black. |
| Do | -2-methylbenzene | Do. |
| Do | -4-methoxybenzene | Do. |
| Do | -2-methyl-4-methoxybenzene | Do. |
| Do | -2-methoxy-5-chlorobenzene | Do. |
| Do | -2,5-dimethoxybenzene | Do. |
| 4-amino-2,5-diethoxy-2'-carboxylic acid-di-methylamide-4'-nitro-azobenzene. | -benzene | Dull greenish blue. |
| 4-amino-2,5-diethoxy-2'-carboxylic acid-di-ethylamide-4'-nitro-azobenzene. | -2-methylbenzene | Middle blue. |
| 4 - amino - 1 - (ortho - carboxylic acid - diethylamide - para - nitro-phenylazo)-5,6,7,8-tetrahydronaphthalene. | -2,4-dimethoxy-5-chlorobenzene | Currant. |
| 4-amino-1-(ortho-carboxylic acid-diethylamide-para-nitro-phenylazo)-naphthalene. | -benzene | Dull very greenish-blue. |
| 4-amino-2-methyl-5-methoxy-2'-nitro-4'-sulfonic acid-dimethyl-amide-azobenzene. | -4-chlorobenzene | Violet-black. |
| 4-amino-2-methyl-5-methoxy-2'-sulfonic acid-diethylamide-4'-nitro-azobenzene. | -2-methyl-4-methoxy-benzene | Blue-violet. |
| Do | -6'-methoxy-3.4-dichlorobenzene | Do. |
| Do | -2,4-dimethoxybenzene | Do. |
| 4-amino-2-methyl-5-ethoxy-2'-sulfonic acid-diethylamide-4'-nitro-azobenzene. | -2-methylbenzene | Reddish black-blue. |
| Do | -4-chlorobenzene | Neutral black. |
| Do | -2-methyl-4-chloro-benzene | Reddish black. |
| 4-amino-2-methyl-5-ethoxy-2'-chloro-4'-nitro-6'-sulfonic acid-di-methyl-amide-azobenzene. | -benzene | Do. |
| Do | -2-methylbenzene | Do. |
| Do | -2-methoxybenzene | Do. |
| Do | -4-chlorobenzene | Do. |
| 4-amino-2,5-dimethoxy-2'-chloro-4'-sulfonic acid-dimethyla-mide-azobenzene. | -2-methyl-4-methoxy-benzene | Do. |
| Do | -6'-bromo-2.4-dimethoxy-benzene | Do. |
| | -6'-methoxy-3.4-dichloro-benzene | Black. |
| 4-amino-2,5-dimethoxy-2'-sulfonic acid-diethylamide-4'-nitro-azobenzene. | -benzene | Greenish black. |
| Do | -2-methylbenzene | Do. |
| Do | -2-methoxybenzene | Blue-black. |
| Do | -4-chlorobenzene | Neutral black. |
| Do | -2-methyl-4-chlorobenzene | Greenish black. |
| Do | -naphthalene | Black. |
| 4-amino-2,5-dimethoxy-2'-nitro-4'-sulfonic acid-dimethylamide-azobenzene. | -benzene | Neutral black. |
| Do | -2-methylbenzene | Reddish black. |
| Do | -2-methoxybenzene | Do. |
| 4-amino-2,5-diethoxy-2'-sulfonic acid-diethylamide-4'-nitro-azo-benzene. | -benzene | Greenish black. |
| Do | -2-methylbenzene | Do. |
| Do | -4-chlorobenzene | Do. |
| Do | -3-nitrobenzene | Do. |
| Do | -naphthalene | Black. |
| Do | -2,4-dimethoxy-5-chlorobenzene | Reddish black. |
| Do | 2-(2',3'-hydroxynaphthoyl-amino)-naphthalene | Black. |
| 4-amino-2, 5-dimethoxy-3'-carboxylic acid-diethylamide-4'-chloroazobenzene. | 4.4'-di-(acetoacetylamino)-3, 3'-dimethyl-diphenyl | Orange-red. |
| 4-amino-2, 5-dimethoxy-2'-carboxylic acid-dimethylamide-4'-nitroazobenzene. | do | Bluish red. |
| 4-amino-2, 5-diethoxy-2'-carboxylic acid-dimethylamide-4'-nitro-azobenzene. | do | Bordeaux. |
| 4-amino-2,5-dimethoxy-2'-sulfonic acid-diethylamide - 4'-nitro-azobenzene. | do | Dark red-brown. |
| 4-amino-2, 5-dimethoxy-3'-sulfonic acid-dimethylamide-5'-tri-fluoromethyl-azobenzene. | 1-(2',3'-hydroxynaphthoyl-amino)—<br>-2-methoxybenzene | Blue-black. |
| 4-amino-2-methyl-5,5'-dimethoxy-4'-nitrilo-2'-sulfonic acid-die-thylamide-azobenzene. | -2-methylbenzene | Deep currant. |
| 4 - amino-2-methyl-5-ethoxy - 5' - methoxy-4'-nitrilo-2'-sulfonic acid-diethyl-amide-azobenzene. | -2-methoxybenzene | Do. |
| 4-amino-2, 5, 5'-trimethoxy-4'-nitrilo-2'-sulfonic acid-diethyl-amide-azobenzene. | -2-methylbenzene | Currant black. |
| 4-amino-2, 5-diethoxy-5'-methoxy-4'-nitrilo-2 -sulfonic acid-diethylamide-azobenzene. | -4-chlorobenzene | Do. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:
1. The water-insoluble azo-dyestuffs of the following general formula:

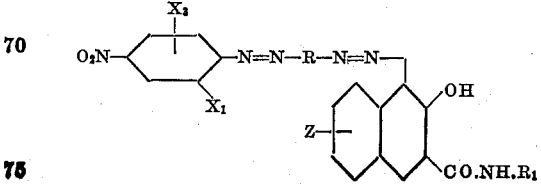

wherein the azo-groups stand in para-position to each other, R and $R_1$ stand for members of the group consisting of radicals of the benzene and naphthalene series, $X_1$ stands for a member of the group consisting of

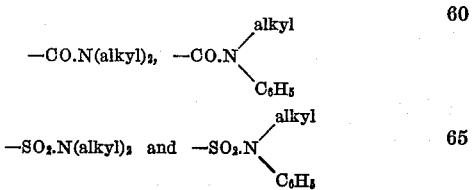

$X_3$ for a member of the group consisting of hydrogen, halogen and alkoxy and Z for a member of the group consisting of hydrogen, halogen and alkoxy, yielding, when produced on the fiber, garnet to black dyeings of good fastness properties.

2. The water-insoluble azo-dyestuffs of the following general formula:

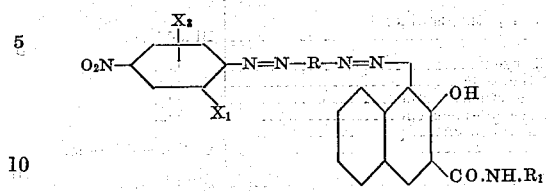

wherein the azo-groups stand in para-positions to each other, R and $R_1$ stand for radicals of the benzene series, $X_1$ stands for a member of the group of —CO.N(alkyl)$_2$, —CO.N$\genfrac{}{}{0pt}{}{\text{alkyl}}{C_6H_5}$ —SO$_2$.N(alkyl), and —SO$_2$.N$\genfrac{}{}{0pt}{}{\text{alkyl}}{C_6H_5}$ and $X_3$ for a member of the group consisting of hydrogen, halogen and alkoxy, yielding, when produced on the fiber, garnet to black dyeings of good fastness properties.

3. The water-insoluble azo-dyestuff of the following formula:

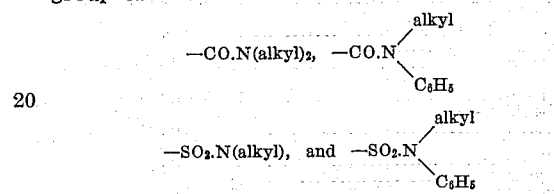

yielding, when produced on the fiber, reddish-black dyeings of very good fastness to light, chlorine and ironing.

4. The water-insoluble azo-dyestuff of the following formula:

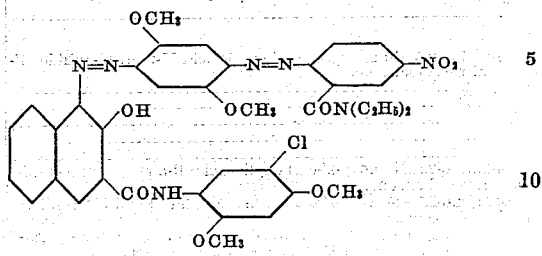

yielding, when produced on the fiber, blue-black dyeings of very good fastness to light, washing and chlorine.

5. Fiber dyed with the water-insoluble azo-dyestuffs as claimed in claim 1.

6. Fiber dyed with the water-insoluble azo-dyestuffs as claimed in claim 2.

7. Fiber dyed with the water-insoluble azo-dyestuff as claimed in claim 3.

8. Fiber dyed with the water-insoluble azo-dyestuff as claimed in claim 4.

9. The water-insoluble azo-dyestuff of the following formula:

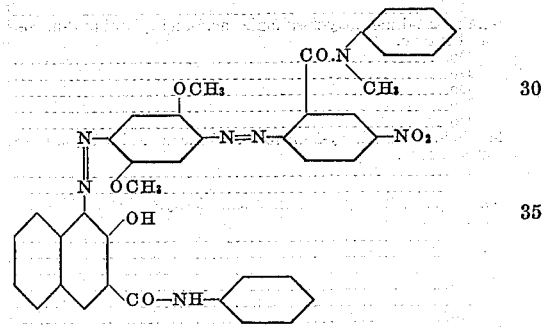

yielding, when produced on the fiber, blue-black dyeings of very good fastness to light, washing and chlorine.

10. Fiber dyed with the water-insoluble azo-dyestuff as claimed in claim 9.

ERWIN THOMA.
WILHELM SEIDENFADEN.